Feb. 12, 1957  W. F. MILLS, SR  2,780,872
INSTALLATION GAUGE FOR A POWER TAKE-OFF
Filed Nov. 4, 1955  3 Sheets-Sheet 1

INVENTOR.
WALTER F. MILLS, SR.
BY
McMorrow, Berman + Davidson
ATTORNEYS.

Feb. 12, 1957  W. F. MILLS, SR  2,780,872
INSTALLATION GAUGE FOR A POWER TAKE-OFF
Filed Nov. 4, 1955  3 Sheets-Sheet 2
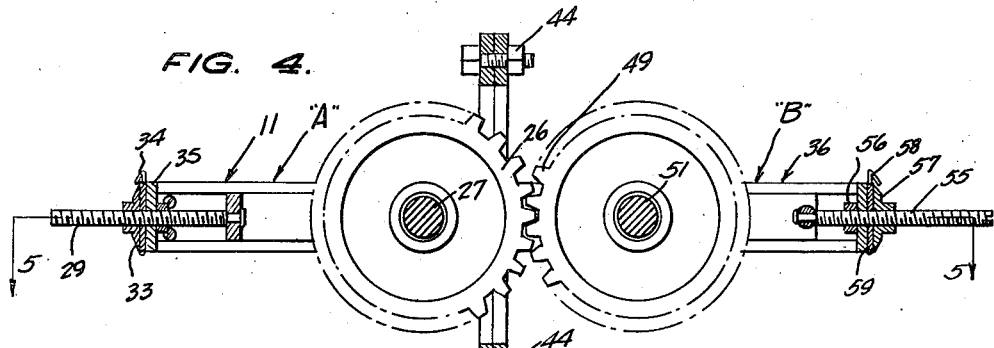
FIG. 4.
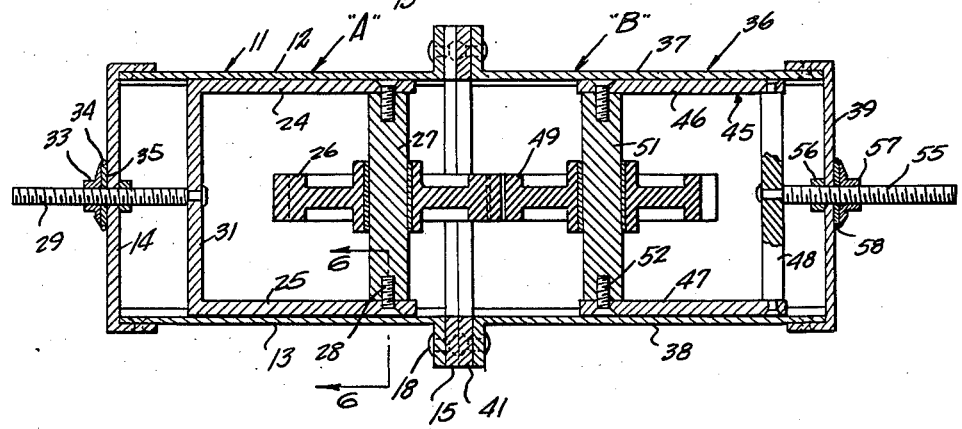
FIG. 5.
FIG. 6.
INVENTOR.
WALTER F. MILLS, SR.
BY
McMorrow, Berman & Davidson
ATTORNEYS.

Feb. 12, 1957 W. F. MILLS, SR 2,780,872
INSTALLATION GAUGE FOR A POWER TAKE-OFF
Filed Nov. 4, 1955 3 Sheets-Sheet 3
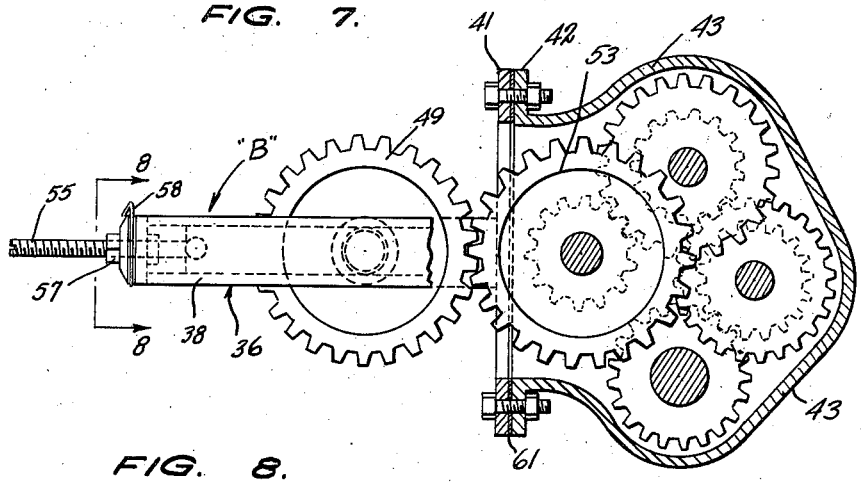
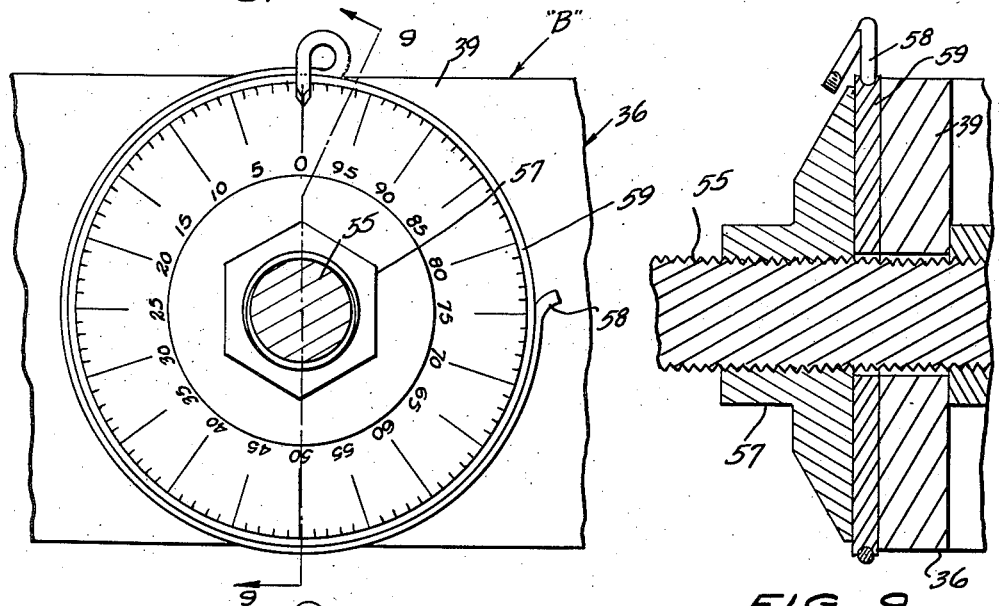
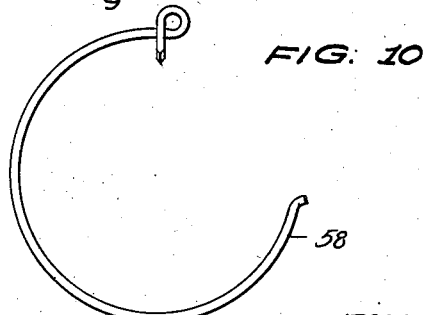
INVENTOR.
WALTER F. MILLS, SR.
BY
McMorrow, Berman & Davidson
ATTORNEYS.

United States Patent Office 2,780,872
Patented Feb. 12, 1957

2,780,872

INSTALLATION GAUGE FOR A POWER TAKE-OFF

Walter F. Mills, Sr., Delmar, Md.

Application November 4, 1955, Serial No. 544,983

3 Claims. (Cl. 33—181)

This invention relates to a gauge for use when installing a power take-off on the transmission of a truck or other vehicle.

An object of the present invention is to provide a gauge for use when installing a power take-off on the transmission of a truck or other vehicle which is of simple construction and easily operated, and one which enables the user to accurately determine the thickness of spacers and shims needed between the power take-off and the transmission.

Another object of the present invention is to provide a gauge for use when installing a power take-off on a transmission which speeds up the installation of the power take-off and enables the user to make most of the adjustments that are necessary at the bench and away from the transmission.

A further object of the present invention is to provide a gauge for use when installing a power take-off on a transmission which may be constructed in all sizes to accommodate all power take-offs and all transmissions, and may be provided with gauge means easily mounted and dismounted for each type of drive and driven gears of the power take-offs and the transmissions.

A still further object of the present invention is to provide a gauge for use when installing a power take-off on a transmission which is of sturdy construction, one economically manufactured and assembled, and one which is highly effective in action.

Figure 1:
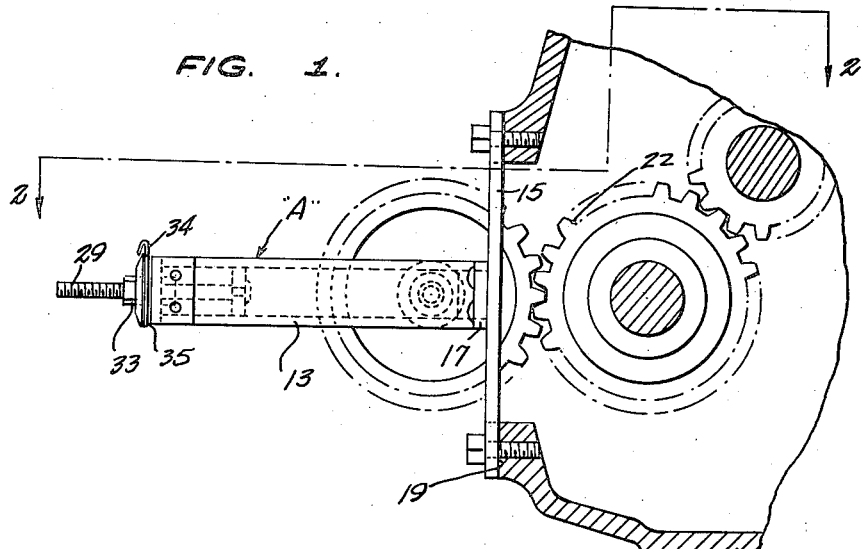
Figure 2:
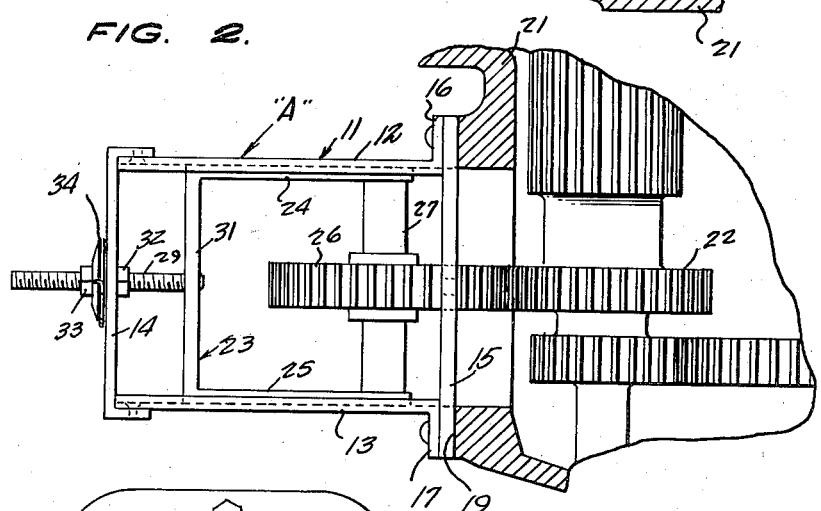
Figure 3:
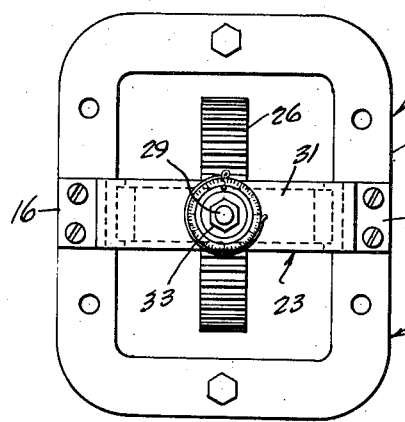

These and other objects and advantages of the present invention will be fully apparent from the following description when taken in connection with the annexed drawings, in which:

Figure 1 is a sectional view of a transmission housing, with a portion of the gauge of the present invention installed thereon, Figure 2 is a view taken on the line 2—2 of Figure 1, Figure 3 is an end view of the gauge portion of Figure 1, removed from the transmission, Figure 4 is a sectional view of the gauge portion of Figure 1 shown attached to a second gauge portion of the present invention, Figure 5 is a sectional view taken on the line 5—5 of Figure 4, Figure 6 is a sectional view, on an enlarged scale, taken on the line 6—6 of Figure 5, Figure 7 is a sectional view of a power take-off unit with the second portion of the gauge of Figure 4 installed thereon, Figure 8 is a view, on an enlarged scale, taken on the line 8—8 of Figure 7, Figure 9 is a sectional view taken on the line 9—9 of Figure 8, and Figure 10 is a view, on a reduced scale, of a pointer element of the present invention.

Referring in greater detail to the drawings in which like numerals indicate like parts throughout the several views, the present invention consists in an installation gauge for determining the spacing between the transmission and power take-off housings when a transmission drive gear is in intermeshing relation with a power take-off driven gear, the gauge comprising a first assembly "A" including a support 11 consisting in a U-shaped frame having legs 12 and 13 and a bight 14. A flange 15 is carried by the support 11, the free ends of the legs 12 and 13 having outwardly-bent portions 16 and 17, respectively, fixed by rivets 18 to the flange 15. The flange 15 has a flat face and is of a size to abuttingly engage and to be detachably secured to a flange 19 which surrounds an opening in a transmission housing 21 adjacent the drive gear 22.

A carriage 23 is connected to the support 11. The carriage 23 also consists in a U-shaped frame having legs 24 and 25 received in trackways formed on the inner faces of the legs 12 and 13, respectively. The trackways connect the carriage 23 with the support 11 for longitudinal forward and backward movement relative to the flange 15.

An element is carried by the carriage 23 for movement about an axis transverse of the carriage 23 and this element has at least one gear tooth conformably shaped to intermesh with adjacent teeth of the transmission drive gear when the flange is bolted or otherwise secured to the flange 19 of the transmission housing 21. This element may take the form of a single finger having a gear tooth on one end or may be a rotatable gear 26, as here illustrated, mounted for free rotation about a shaft 27 which is arranged transversely of the carriage 23 and has its ends fixedly secured in the legs 24 and 25 of the carriage 23. The shaft 27 constitutes the transverse axis for the element which embodies the gear 26. Flat-headed screws 28 secure the shaft 27 to the legs 24 and 25 of the carriage 23.

Means is provided operatively connected to the carriage 23 for effecting the movement of the latter. Specifically, this means consists in a threaded rod 29 fixed by one end to the bight 31 of the carriage 23 and extending through a hole in the bight 14 of the support 11. A locking nut 32 is threaded on the rod 29 between the bight 14 of the support 11 and the bight 31 of the carriage 23. An indicator nut 33 is threaded on the rod 29 exteriorly of the bight 14.

Cooperating indicating means is provided on the above-mentioned means and on the support 11 for designating the spacing between the teeth of the gear 26 and the adjacent teeth on the transmission drive gear 22 upon execution of the forward and backward movement of the carriage 23. Specifically, this cooperating indicating means consists in a dial face upon the indicator nut 33 and a pointer element 34 carried on a washer 35 which is interposed between the rearward face of the indicator nut 33 and the adjacent portion of the bight 14 of the support 11, the washer 35 being securely fixed to the adjacent portion of the bight 14.

A second assembly "B" is provided and includes a second support 36 consisting in another U-shaped frame having legs 37 and 38 and a bight 39. A second flange 41 is carried by the second support 36 and also has a flat face of a size to abuttingly engage and to be detachably secured to a flange 42 surrounding an opening in a power take-off housing 43. The flange 42 of the housing 43 is identical in size and shape with the flange 19 on the transmission housing 21, so therefore the flange 42 on the second support 36 will also abuttingly engage and is adapted to be detachably secured to the flange 15 on the first support 11, as shown in Figures 4 and 5. When the flange 15 and the flange 41 are in the abuttingly engagement position, nut and bolt assemblies 44 form fastening elements extending through the flanges 15 and 41 for securing the supports 11 and 36 together.

A second carriage 45 is connected to the second support 36 for longitudinal forward and backward movement relative to the second flange 41. The second carriage 45 also consists in a U-shaped frame having legs 46 and 47 and a bight 48, the legs 46 and 47 being received in trackways formed on the inner faces of the legs 37 and 38, respectively, of the second support 36.

A member embodying another gear 49 is carried by the second carriage 45 for movement about an axis transverse of the second carriage 45, the axis embodying a shaft 51 having its ends fixedly secured by means of flat-headed screws 52 to the legs 46 and 47 of the second carriage 45. The member constituting the gear 45 has at least two gear teeth conformably shaped to intermeshingly receive therebetween one of the teeth of the gear 26 when the flange 41 is secured to the flange 15, or to intermeshingly receive therebetween a tooth of the power take-off driven gear 53 within the power take-off housing 43.

Other means is operatively connected to the second carriage 45 for effecting the movements of the latter. Specifically, this means includes another threaded rod 55 having one end fixedly secured in the bight 48 of the second carriage 45 and extending through a hole in the bight 39 of the second support 36. A locking nut is threaded upon the rod 55 between the bight 48 and the bight 39 and an indicator nut 57 is mounted upon the rod 55 exteriorly of the bight 39 of the second support 36.

Cooperating indicating means is provided on the other means which constitutes the threaded rod 55 and on the second support 36 for designating the spacing between the teeth of the gear 49 and the teeth on the gear 26 upon execution of the forward and backward movement of the second carriage 45 when the first flange 15 is secured to the second flange 41 in abutting relation. Specifically, this cooperating indicating means includes a dial fixedly carried by the indicator nut 57 on the outer face of the latter and another pointer element 58 mounted in the peripheral groove of a washer 50 which is fixedly secured to the bight 39 of the second support 36. The indicator nuts 33 and 57 are identical and their dials are identical and the pointer elements 34 and 58 are also identical, the indicator nut 57 with its pointer element 58 and the washer 59 being shown in detail in Figures 8 to 10, inclusive.

In use, the flange 15 of the first assembly "A" is bolted to the flange 19 of the transmission housing 21 without spacers or shims therebetween. The locking nut 32 and the indicator nut 33 on the rod 29 are both loosened so that the gear 26 is out of contact with the drive gear 22 of the transmission housing 21. The gear 26 is then moved by moving the carriage 23 forwardly until the gear 26 meshes with the drive gear 22 without either pressure or clearance. The gear 26 may be rocked and partially rotated upon the shaft 27 so that the user can feel when this condition has been reached. The locking nut 32 and the indicator nut 33 are then locked upon the bight 14 of the support 11 and the pointer element 34 is moved in its groove on the washer 35 to a position in which its point registers with "Zero" on the dial face of the indicator nut 33. The indicator nut 33 and the locking nut 32 are loosened and the gear 26 is moved away from the gear 22 to a position in which it has proper clearance with the gear 22 as felt by the fingers of the user of the gauge of the present invention. The indicator nut 33 and the locking nut 32 are again tightened upon the bight 14. At this point, a reading is taken of the position of the point of the pointer element on the dial face of the indicator nut 33. This reading will be in thousandths of an inch when the threads of the rod 29 and the scale on the dial face of the indicator nut 33 have the proper relationship.

The assembly "A" is next unbolted from the transmission housing 21 and is carried to the bench. The assembly "B" is now bolted to the assembly "A" without either spacers or shims between their respective flanges and with the gear 49 of the assembly "B" backed away from the gear 26. In the next step, the gear 49 is advanced forwardly to mesh with the gear 26 by adjusting the locking nut 56 and the indicator nut 57 on the threaded rod 55. The gear 49 should be brought to a position in which its teeth intermesh with the teeth of the gear 26 without either pressure or clearance. The pointer element 58 is then turned upon the washer 59 to where it coincides with the "Zero" mark on the indicator nut 57. The lock nut 56 is now loosened and the indicator nut 57 is turned in a clockwise direction to read the same as the original setting on the indicator nut 33 in the assembly "A." Next, this setting of the indicator nut 57 is secured by moving up the lock nut 56 to firm engagement with the bight 39. The gear 49 has now been moved away from the gear 26 to establish the same clearance as between gear 26 and the drive gear 22 and a duplicate in miniature of the transmission has been formed.

Assembly "A" is next unbolted from the assembly "B" and assembly "A" is laid aside. Assembly "B" is next bolted to the power take-off housing 43 by bolting flange 41 of the assembly "B" to the flange 42 of the housing 43. A suitable number of spacers and shims indicated by the reference numeral 61 in Figure 7 are now inserted between the flanges 41 and 42 by the trial and error method, until the rotation of the gear 49 by the fingers of the user informs the user that the same clearance obtained between the gear 26 and the drive gear 22 has been obtained. More spacers or shims are added or taken away from the assembly until this "feel" is obtained. When the user is satisfied that as nearly a correct setting as is possible by the feel of the hand has been obtained, such setting is proved by loosening the lock nut 56 and the indicator nut 57 and moving them both away from the bight 39. Next the gear 49 is moved forward to intermesh with the power take-off gear 53 without either pressure or clearance as in both previous settings. Next, the lock nut 56 is brought back to rest against the bight 39 without moving the threaded rod 55 and the indicator nut 57 is locked firmly by hand pressure against the opposing side of the bight 39 to secure this position. If the indicator nut 57 shows "Zero" under the pointer element 58, the clearance is correct. If the "Zero" goes past the pointer element 58, an insufficient amount of shim is indicated and the proper amount of shim or spacer needed to correct it will be shown in thousandths of an inch on the indicator between "Zero" and the pointer element 58. If "Zero" on the indicator nut does not reach the pointer element 58, an excess of shim is indicated and the proper amount to be removed is shown in thousandths of an inch on the indicator nut between "Zero" and the pointer element 58. When these corrections have been made, the assembly "B" is then removed from the power take-off and the power take-off, with all the spacers and shims used to obtain the final "Zero" setting, is installed on the transmission in one application without further consideration.

What is claimed is:

1. An installation gauge for determining the spacing between the transmission and power take-off housings when a transmission drive gear is in intermeshing relation with a power take-off driven gear comprising a first support, a first flange carried by said support and having a flat face adapted to abuttingly engage and be detachably secured to a flange surrounding a transmission housing opening, a first carriage connected to said support for longitudinal forward and backward movement relative to said flange, an element carried by said carriage for movement about an axis transverse of said carriage, said element having a gear tooth conformably shaped to intermesh with adjacent teeth of said transmission drive gear, means operatively connected to said carriage for effecting the movements of the latter, cooperating indicating means on said means and on said support for designating the spacing between said gear tooth and the adjacent teeth on the said transmission drive gear upon execution of the forward and backward movement of said carriage, a second support, a second flange carried by said second support and having a flat face adapted to abuttingly engage and be detachably secured to a flange surrounding a power take-off housing opening and to abuttingly engage and be detachably secured to said first flange, a second carriage connected to said second support for longitudinal forward and backward movement relative to said second flange, a member carried by said second carriage for movement about an axis transverse of said second carriage, said member having at least two gear teeth conformably shaped to intermeshingly receive therebetween a tooth of said power take-off driven gear, other means operatively connected to said second carriage for effecting the movements of the latter, and cooperating indicating means on said other means and on said second support for designating the spacing between said two gear teeth and said one tooth on said element upon execution of the forward and backward movement of said carriage when said first and second flanges abut and are detachably secured together.

2. An installation gauge for determining the spacing between the transmission and power take-off housings when a transmission drive gear is in intermeshing relation with a power take-off driven gear comprising a first support, a first flange carried by said support and having a flat face adapted to abuttingly engage and be detachably secured to a flange surrounding a transmission housing opening, a first carriage connected to said support for longitudinal forward and backward movement relative to said flange, an element carried by said carriage for movement about an axis transverse of said carriage, said element having a gear tooth conformably shaped to intermesh with adjacent teeth of said transmission drive gear, means operatively connected to said carriage for effecting the movements of the latter, cooperating indicating means on said means and on said support for designating the spacing between said gear tooth and the adjacent teeth on the said transmission drive gear upon execution of the forward and backward movement of said carriage, a second support, a second flange carried by said second support and having a flat base adapted to abuttingly engage and be detachably secured to a flange surrounding a power take-off opening, a second carriage connected to said second support for longitudinal forward and backward movement relative to said second flange, a member carried by said second carriage for movement about an axis transverse of said second carriage, said member having at least two gear teeth conformably shaped to intermeshingly receive therebetween a tooth of said power take-off driven gear, other means operatively connected to said second carriage for effecting the movements of the latter, cooperating indicating means on said other means and on said second support for designating the spacing between said two gear teeth and said one tooth on said element upon execution of the forward and backward movement of said second carriage when said first and second flanges abut and are detachably secured together, said second flange being arranged to abuttingly engage said first flange, and detachable fastening elements extending through said first and second flanges for securing said first and second supports together.

3. An installation gauge for determining the spacing between the transmission and power take-off housings when a transmission drive gear is in intermeshing relation with a power take-off driven gear comprising a first support, a first flange carried by said support and having a flat face adapted to abuttingly engage and be detachably secured to a flange surrounding a transmission housing opening, a first carriage connected to said support for longitudinal forward and backward movement relative to said flange, a shaft arranged transversely of said carriage and fixedly secured thereto, a gear rotatably mounted upon said shaft and having teeth conformably shaped to intermesh with the teeth of said transmission drive gear, means operatively connected to said carriage for effecting the movements of the latter, cooperating indicating means on said means and on said support for designating the spacing between said gear and said transmission drive gear upon execution of the forward and backward movement of said carriage, a second support, a second flange carried by said second support and having a flat base adapted to abuttingly engage and be detachably secured to a flange surrounding a power take-off housing opening, a second shaft arranged transversely of said second carriage and fixedly secured thereto, another gear rotatably mounted upon said second shaft and having teeth conformably shaped to intermesh with the teeth of said power take-off driven gear, other means operatively connected to said second carriage for effecting the movements of the latter, and cooperating indicating means on said other means and on said second support for designating the spacing between said another gear and said first-named gear upon execution of the forward and backward movement of said second carriage when said first and second flanges abut and are detachably secured together, and for designating the spacing between the flat face of said second flange and the flange surrounding said power take-off housing opening when said second flange abuts and is detachably secured to said last-named flange.

References Cited in the file of this patent

UNITED STATES PATENTS

| | | |
|---|---|---|
| 2,122,840 | Hafen | July 5, 1938 |
| 2,470,635 | Moss | May 17, 1949 |